United States Patent [19]

Spencer

[11] 3,913,811
[45] Oct. 21, 1975

[54] UTILITY CARRIER

[76] Inventor: Jimmy J. Spencer, 348 Clearfield Ave., Chesapeake, Va. 23320

[22] Filed: Aug. 1, 1973

[21] Appl. No.: 384,405

[52] U.S. Cl.................................. 224/42.08; 296/58
[51] Int. Cl.².......................................... B60R 9/00
[58] Field of Search....... 224/42.03 R, 42.07, 42.08, 224/42.03 A, 42.03 B, 42.43, 42.44; 296/56, 53, 57, 58, 59, 60

[56] References Cited

UNITED STATES PATENTS

| | | | |
|---|---|---|---|
| 1,421,336 | 6/1922 | Woods | 296/58 |
| 1,506,274 | 8/1924 | Specht | 224/42.03 R |
| 1,530,584 | 3/1925 | Vandersant | 296/58 |
| 1,838,500 | 12/1931 | Russell et al. | 224/42.08 |
| 1,977,734 | 10/1934 | Monckmeier | 224/42.08 |
| 1,979,401 | 11/1934 | Nelson | 296/58 |
| 2,027,852 | 1/1936 | Allan | 224/42.03 R |
| 2,560,570 | 7/1951 | Harig | 224/42.44 |
| 3,039,634 | 6/1962 | Hobson et al. | 224/42.03 R |
| 3,158,302 | 11/1964 | Dickerson | 224/42.43 |
| 3,428,332 | 2/1969 | McCance | 224/42.03 B |

FOREIGN PATENTS OR APPLICATIONS 570,992   9/1923   France................................. 224/29

Primary Examiner—Frank E. Werner
Assistant Examiner—Kenneth Noland
Attorney, Agent, or Firm—William E. Fears

[57] ABSTRACT

A foldable utility platform with means for securing the same in horizontal carrying position, and in upright stored position, for attachment to a standard carrier trailer hitch.

1 Claim, 6 Drawing Figures

UTILITY CARRIER

The present invention relates to a foldable platform support which is detachably secured to a stationary attached rectangular sleeve hitch or rectangular shaped stationary structural support member affixed to the rear of an automobile, camper, or carrier, being hinged, and adjustable for carrying substantially heavy mowing machines and the like in carrier position, yet adapted for folding upward and retaining in a storage position.

BACKGROUND OF THE INVENTION

With the advent of campers, self-propelled mobile homes, and utility carriers, and a population becoming more transient, it has become necessary to provide a platform carrier which can be easily and detachably affixed to the rear of an automobile, camper, self-propelled mobile home, and the like. Although the prior art discloses various devices for carrying bicycles and light objects of all sorts, nothing has been developed to carry heavy objects such as self-propelled lawnmowers and the like. The prior art discloses rather fragile mechanical arrangements or devices for transporting light objects by attachments to bumpers of automobiles and the like, but this places the entire load on the rear of the carrier vehicle, and heavy objects cannot be carried without damage to the rear springs of the automobile or main vehicle. Accordingly, the present invention relates to a utility platform carrier detachably affixed to a stationary sleeve trailer hitch, or support member on the rear of automobiles and the like for transporting relatively heavy general cargo.

SUMMARY OF THE INVENTION

The present invention includes a foldable support platform or bed so supported by foldable support arms, affixed to braces, and attached to a main structural support member, which is detachably affixed to a mounting sleeve trailer hitch affixed to the frame of an automobile or other vehicle, capable or carrying heavy cargo loads, with weight distributed through the main frame portion of the automobile or main vehicle in operable position for carrying, and adapted for compactly folding in upright position when in non-use position.

The primary object is to provide a foldable utility platform for carrying heavy objects detachably affixed to an automobile, truck, camper and the like.

Other objects and advantages will become apparent in the following specification when considered in the light of the attached drawings and description.

DESCRIPTION OF PREFERRED EMBODIMENT

Figure 3:
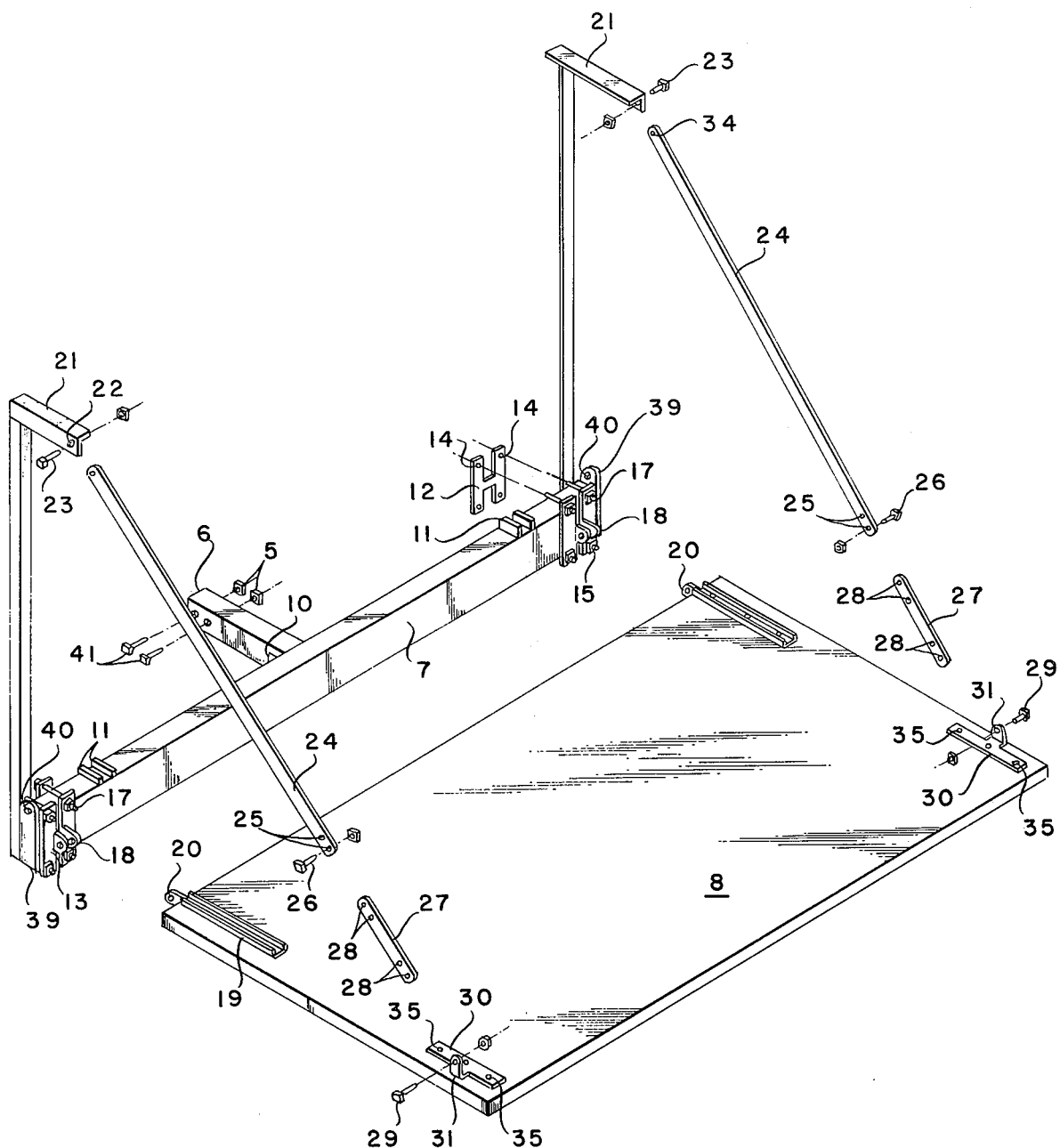
FIG. 3 is a more detailed top perspective showing the assembly parts of the inventive apparatus in disassembly for better understanding.
Figure 5:
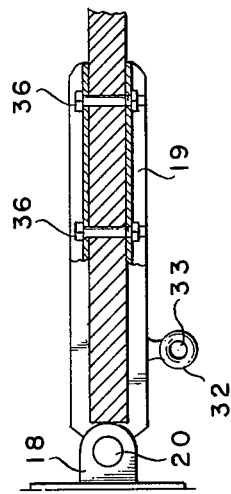
FIG. 5 is a transverse cross section taken along line 5—5 of FIG. 4 looking in the direction of the arrows to demonstrate the double sided platform support hinge, and integral parts thereof.
Figure 6:
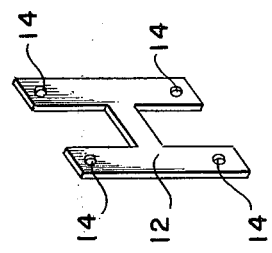
FIG. 6 is a perspective plan view of the H-shaped connecting brackets for affixing the foldable platform to the main support member.
Figure 4:
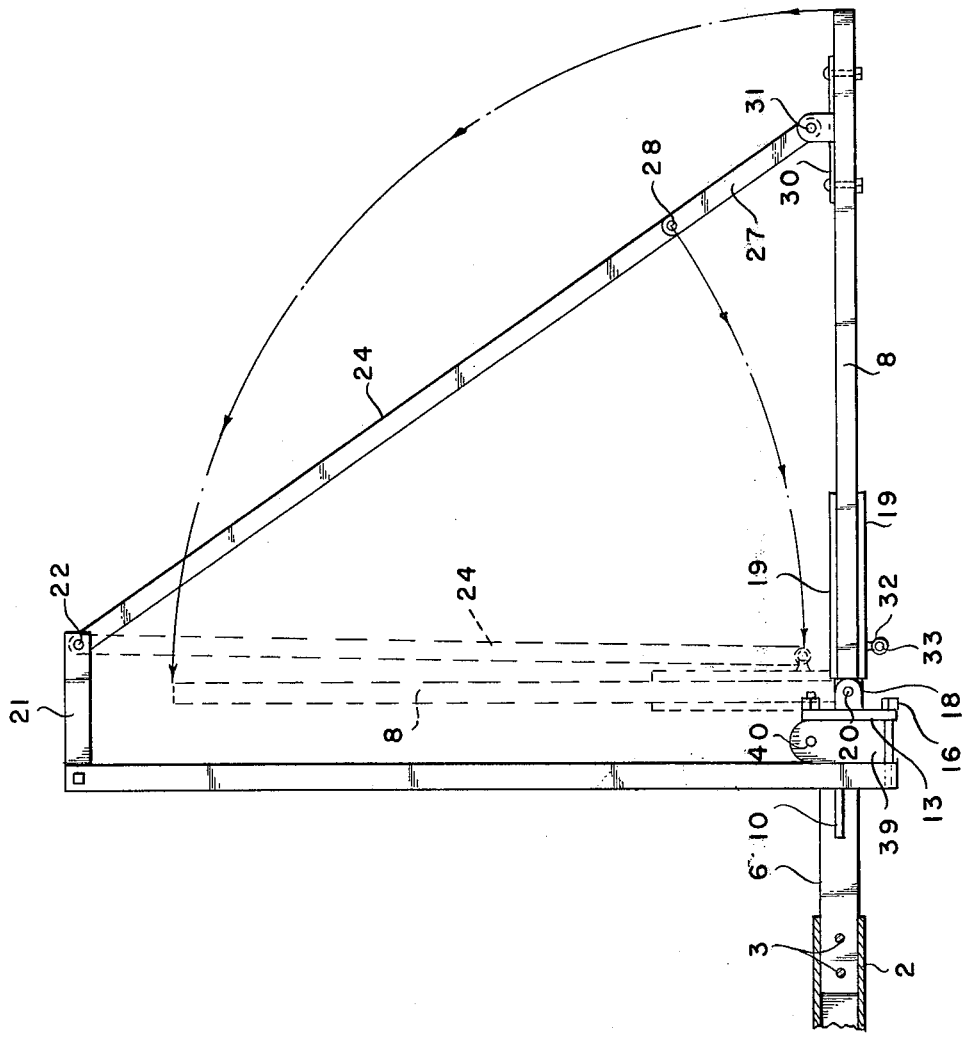
FIG. 4 is a side elevation showing the platform, and assembly in carry all position, with demonstrable outline demonstrating the platform in folded transportable position without a load thereon.

Referring now to the drawings in detail wherein like reference characters indicate like parts throughout the several figures the reference numeral 1 indicates an automobile with a permanently frame attached rectangular fixed sleeve trailer hitch 2 with keeper pin connecting holes 3 therein, this rectangular fixed sleeve hitch 2, being old in the art, and affixed in a weight distribution attachment to the rear portion of the frame (not shown) of the automobile 1. The rectangular-shaped foldable utility support platform or bed 8, is assembled and affixed to the sleeve hitch 2 through rectangular shaped connecting bar mounting sleeve 6, which is smaller than hitch 2, and telescopes within hitch 2 as shown, with matching keeper pin connecting holes 3 being aligned for insertion of pin or pins or bolts 4. Sleeve 6 and hitch 2 may only have one connecting hole 3 and one connecting pin 4 as an embodiment, with the use of a standard sized connecting pin 4. Bar mounting sleeve 6 is integrally affixed to the rectangular-shaped main structural support member 7 by permanent attachment as by weld or bolting, and reenforced by welded plate triangular braces 10 affixed to support member 7 and mounting sleeve 6 by welds. Rectangular-shaped foldable utility support platform or bed 8 is attached to support member 7 by bolting in place. H-shaped front connecting brackets 13 in front of member 7 juxtopositioned to H-shaped rear connecting brackets 12 by holding bolts 16 through matching bolt holes 14 and 15. These are placed in a predetermined position by seating at least one bolt 16 in place between spacer bars 11 which are welded in permanent position on the top of support member 7. Front H-shaped connecting brackets 13 have integral hinge eyelets 18 for alignment of hinge pivot holes 20 which are integral to double sided platform support hinges 19 which are held in place by bolts through the bearing surface of pivot hole 20 by bolts (not shown). Hinges 19 are affixed to the utility platform 8 by attachment bolts 36 through suitable holes in platform 8, with hinge 19 juxtoposed. Platform 8 is rotatably placed in position through inverted L-shaped vertical support frame member or brace 21 being attached in place on support member 7 by positioning of H-shaped rear connecting brackets 12 through matching bolt holes through frame member 21 against the back of support member 7, and held in place by bolting through H-shaped front connecting brackets 13. This can be modified by integrally welding H-shaped rear member 12 to support frame member 21 and affixing it to H-shaped rear member 13 by bolting. L-shaped vertical support frame member 21 is attached by bolting through support frame attachment holes 22 to upper pivoted platform support arms or bars 24 which may be partially rotated about holes 21. The lower ends of support arms 24 are adjustably attached to lower pivotal platform support arms or bars 27 through bolt holes 25 by suitable bolts 26 as shown. Both upper support arms 24 and lower support arms 27 have suitable support arm adjustment holes 28 in at least two different positions as shown in drawings (FIG. 3) for adjusting utility platform 8 to a slight angle from the horizontal position as determined by the load carried on platform 8. The lower ends of support arms 27 are attached to upper platform adjustment brackets 30 through the integral upper platform attachment eyelets 31 by suitable lower pivotal platform support arm adjustment bolts 29. Again, these may be adjusted in at least two positions by use of at least two adjustment holes 28 in the lower end of lower support arms 27. Main structural L-shaped support member protective plates 39 are affixed to each end of member 7 by welds to provide protection from personal injury from open ends of member 7, and at the same time, by use of protective plate tie down holes 40 to provide a means of securing a load on platform 8 securely by tie down ropes or wires (not shown). Brackets 30 are securely attached to platform 8 through upper platform attachment bracket holes 35 by attachment bracket bolts 37 through matching bolt holes 35 in bracket 30 and platform 8. In utility position platform 8 is held as shown in substantially a horizontal position to carry heavy objects or machines such as conventional self-propelled lawnmower 38. When not in use, by simply disconnecting bolts 26 and pivoting upper arms 24 upward platform 8 may be raised to the substantially vertical position and secured by rotating arms 24 behind the platform 8, securing arms 24 by attaching them to the double-sided platform support hinges pivoted platform support eyelets 32 through eyelet holes 33 by bolts 26. When arm 27 is disconnected it simply rotates downward into a downward position against the top of platform 8.

Figure 1:
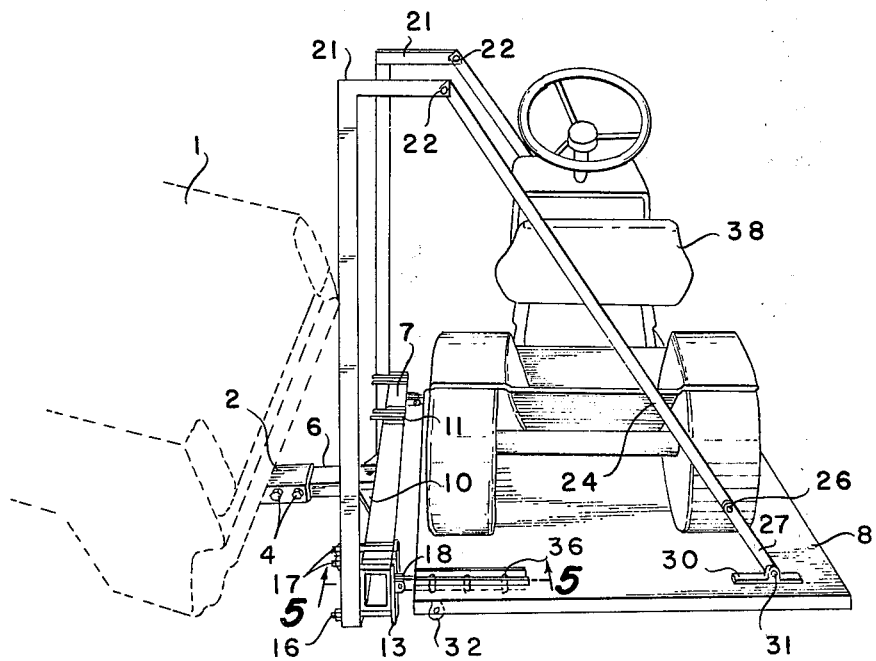
FIG. 1 is a detailed top end perspective view of the platform and assembly in a carry position, affixed to an automobile, and demonstrably depicting a self-propelled lawnmower in position on the platform.
Figure 2:
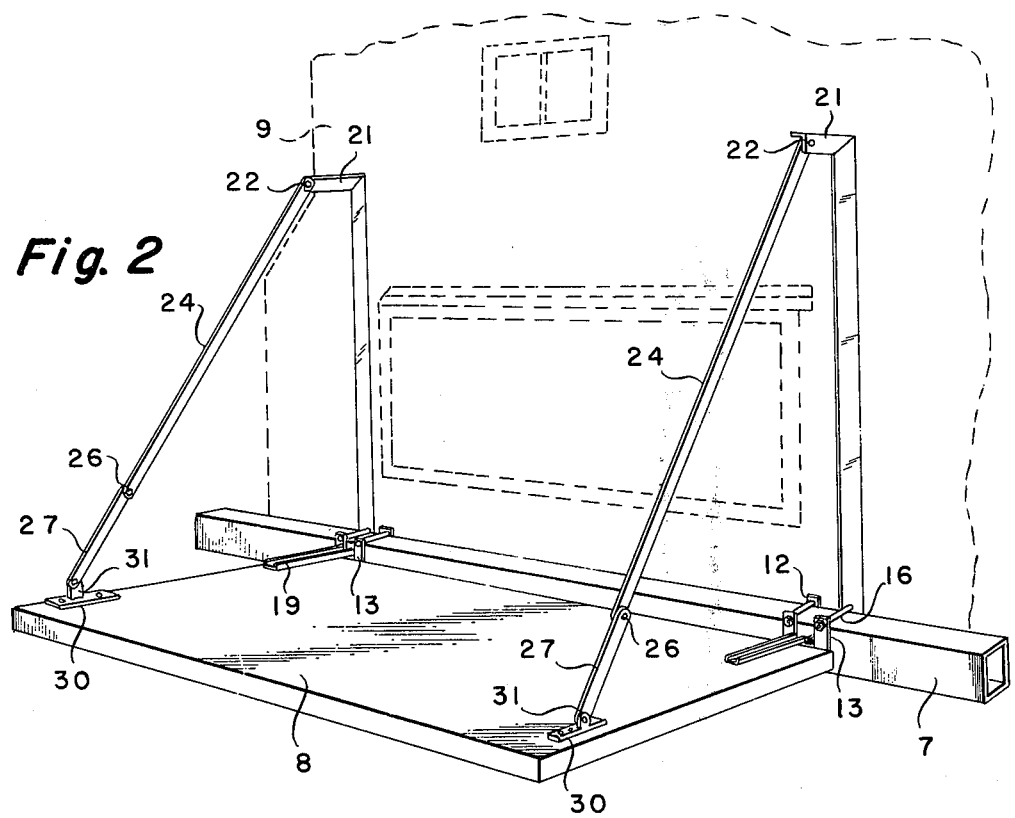
FIG. 2 is detached top perspective of the platform, and assembly in a carry position affixed to the rear end of a standard camper.

Another modification of this invention is its employment as a carrier attached to the fixed bumper of a camper as shown in FIG. 2. In this modification the rectangular shaped main structural support member 7 is already permanently affixed to the frame of the carrier in a manner so as to balance the load through the main frame of the carrier, rather than just the bumper as is already known in the art. The platform is affixed to support member 7 by use of the H-shaped front connecting brackets 13 and the H-shaped rear connecting brackets 12 by suitable bolts 16 as in the first described attachment demonstrated in FIG. 1. The remainder of the parts of the assembly is assembled in the same manner as decmonstrated hereinbefore demonstrated in FIG. 1.

The various parts of the assembly in this invention may be made of suitable strong rigid material such as a metal alloy or a plastic and the types of materials are not pertinent.

Having thus described the preferred embodiment of the invention and the modifications, it should be understood that numerous structural modifications and adaptations may be resorted to without departing from the spirit of the invention.

What is claimed is:

1. A foldably mounted utility carrier adapted to be detachably mounted to an automobile and the like standard fixed rectangular shaped trailer sleeve hitch, comprising a rectangular shaped connecting bar mounting sleeve with connecting pin holes therein adapted for telescoping into the fixed rectangular sleeve hitch and affixing it thereto by connecting pin through juxtaposed holes, said connecting bar mounting sleeve being integrally affixed to a rectangular-shaped main structural support member by welded plate triangular braces, said rectangular shaped main structural support member having a foldable platform attached thereto by inverted L-shaped vertical support frame members with pivotal support arm attached thereto by bolting, and adapted for disconnection from said platform and pivoting said platform to a horizontal carry position or to a vertical storage position, said platform being hinged to a main support member platform hinges having integral eyelet on the bottom side of said hinges, H-shaped front and rear attachment brackets comprising juxtaposed bolt holes for bolting together the brackets, said front bracket having integral hinge eyelets for receiving said platform hinges to support said platform said pivotal support arms adapted to vertically pass substantially along the bottom of said platform while in a stored upright position and fastening said support arms along the bottom of said platform to the platform hinge eyelets by fastening means.

* * * * *